United States Patent
Schmidt et al.

(10) Patent No.: US 12,512,761 B2
(45) Date of Patent: Dec. 30, 2025

(54) DC-TO-DC CONVERTER COMPRISING A CURRENT SENSOR ARRANGEMENT

(71) Applicant: AVL List GmbH, Graz (AT)

(72) Inventors: Martin Schmidt, Langen (DE); Erwin Reisinger, Feldkirchen bei Graz (AT)

(73) Assignee: AVL List GmbH, Graz (AT)

( * ) Notice: Subject to any disclaimer, the term of this patent is extended or adjusted under 35 U.S.C. 154(b) by 208 days.

(21) Appl. No.: 18/029,140

(22) PCT Filed: Sep. 28, 2021

(86) PCT No.: PCT/AT2021/060349
§ 371 (c)(1),
(2) Date: Mar. 29, 2023

(87) PCT Pub. No.: WO2022/067364
PCT Pub. Date: Apr. 7, 2022

(65) Prior Publication Data
US 2023/0369981 A1    Nov. 16, 2023

(30) Foreign Application Priority Data
Sep. 29, 2020 (AT) ............... A 50834/2020

(51) Int. Cl.
*H02M 3/158*    (2006.01)
*H02M 1/00*    (2006.01)

(52) U.S. Cl.
CPC ....... *H02M 3/1586* (2021.05); *H02M 1/0009* (2021.05); *H02M 1/0043* (2021.05); *H02M 3/1584* (2013.01)

(58) Field of Classification Search
CPC ............. H02M 1/0043; H02M 1/0009; H02M 3/1584; H02M 7/53871; H02M 3/1586
See application file for complete search history.

(56) References Cited

U.S. PATENT DOCUMENTS 6,278,263 B1 *  8/2001  Walters ............... H02M 3/1584
                                                           323/272
8,963,521 B2 *  2/2015  Wei ..................... H02M 3/1584
                                                           323/272

(Continued)

FOREIGN PATENT DOCUMENTS

CN      201369679      12/2009
DE     102012106262      1/2014

(Continued)

OTHER PUBLICATIONS

Internationaler Recherchenbericht und Schriftlicher Bescheid [International Search Report and the Written Opinion] Dated Jan. 4, 2022 From the International Searching Authority Re. Application No. PCT/AT2021/060349 and Its Translation of Search Report Into English.

*Primary Examiner* — Gary L Laxton

(57) ABSTRACT

DC-to-DC converter for converting an input direct voltage $V_1$ into at least one variable output direct voltage $V_{out}$, comprising at least two switched converter units (2, 2') each having at least one electronically controllable half bridge (3, 3'), and a control unit (4) which is designed to control the half bridges (3, 3') in a modulation method with a variable period duration and a variable duty cycle, wherein a dedicated current sensor (6, 6') is provided in each of the output lines (5, 5') of the converter units (2, 2'), and the control unit (4) is designed to receive the amperages 12, 12' of the converter units (2, 2') measured by the current sensors (6, 6'), and to control the converter units (2, 2') with duty cycles which differ from one another, in particular to activate individual converter units (2, 2') with duty cycles which are reduced compared to other converter units (2, 2'), or not to activate these, wherein the output lines (5, 5') of the converter units (2, 2') are interconnected after the current sensors (6, 6') so that the currents of the output lines (5, 5')

(Continued)

are summed, wherein the control unit (4) is designed to calculate the sum current $I_{out}$, and that the control until (4) is designed to compare the sum current $I_{out}$ with the nominal currents $I_N$, $I_N'$ and to activate that converter unit (2, 2') whose assigned current sensor (6, 6') has a nominal current which is greater than the sum current $I_{out}$, but lies closest to the sum current $I_{out}$, or to activate those converter units (2, 2') the sum of whose nominal currents is greater than the sum current, but lies closest to the sum current, so that the amperages in the output lines (5, 5') of the activated converter units (2, 2') are in each case below, but as close as possible to, the nominal current $I_N$, $I_N'$ of the assigned current sensors (6, 6').

16 Claims, 2 Drawing Sheets

(56) References Cited

U.S. PATENT DOCUMENTS

| 10,063,146 B1 | 8/2018 | Lee |
| 2004/0046535 A1 | 3/2004 | Duffy et al. |
| 2009/0153110 A1 | 6/2009 | Huang |
| 2010/0033154 A1 | 2/2010 | Cheng et al. |
| 2014/0015500 A1 | 1/2014 | Babazadeh et al. |

FOREIGN PATENT DOCUMENTS

| DE | 102015200716 | 7/2016 |
| DE | 112015002622 | 2/2017 |
| EP | 2863528 | 4/2015 |
| JP | 2010-142018 | 6/2010 |
| JP | 2015-012743 | 1/2015 |
| WO | WO 2013/174967 | 11/2013 |
| WO | WO 2017/213030 | 12/2017 |
| WO | WO 2020/129157 | 6/2020 |

* cited by examiner

DC-TO-DC CONVERTER COMPRISING A CURRENT SENSOR ARRANGEMENT

RELATED APPLICATIONS

This application is a National Phase of PCT Patent Application No. PCT/AT2021/060349 having International filing date of Sep. 28, 2021, which claims the benefit of priority of Austria Patent Application No. A 50834/2020 filed on Sep. 29, 2020. The contents of the above applications are all incorporated by reference as if fully set forth herein in their entirety.

FIELD AND BACKGROUND OF THE INVENTION

The invention relates to a DC-to-DC converter with a current sensor arrangement and a cell tester having such a DC-to-DC converter.

Controlled DC-to-DC converters (DC/DC converters) for converting an input direct voltage into one or more time-variable output direct voltages using switched converter units with electronically controllable half bridges are known from the prior art. An electronic control unit ensures the synchronous activation of the converter units by switching the half bridges on and off with a variable period duration and a variable duty cycle using a modulation method, for example pulse width modulation (PWM). The semiconductor switches of the half bridges switch the input direct voltage on and off with high switching frequency; a downstream filter arrangement smoothes the generated voltage pulse and converts it into the desired output direct voltage. The switching frequency is well above the mains frequency and usually above 20 kHz. The output direct voltage can be lower or higher than the input direct voltage and can have the same or different polarity.

In order to measure the transmitted current or the transmitted power, it is known for the output current to be measured by a current sensor arrangement. However, one problem is that, with conventional current sensors, high accuracy is only possible within a narrowly defined measuring range.

Therefore, in the prior art, an attempt is usually made to dimension the current sensor arrangement in such a way that the desired accuracy is achieved exactly within the expected current range. With conventional current sensors, if the expected current range is exceeded the measuring range is switched. However, this results in discontinuities which are all the more disturbing the higher the dynamics of the useful signal provided. For example DE 102012106262 A1, EP 2863528 A1, U.S. Pat. No. 20,100,33154 A1, WO 2013174967 A1, DE 102015200716 A1 are known from the prior art.

However, cell testers of electric battery modules or fuel cells in particular require the provision of direct voltages with very high dynamics both in the time domain and in terms of the magnitude of the load current. A very high measurement accuracy would be desirable here over a wide current range and with high dynamics. Specific requirements include for example the high-precision measurement of the current or power at variable direct voltages with dynamics of up to 150 kHz in a current range of 0 A-250 A or higher.

SUMMARY OF THE INVENTION

The object of the invention is thus to remedy these problems and provide an electrical DC-to-DC converter and a cell tester which is able to generate temporally highly dynamic direct voltages, and to measure the currents thereby transmitted with constant and high accuracy over a very wide measuring range.

This object is achieved by a device according to claim 1.

A DC-to-DC converter according to the invention is designed to convert an input direct voltage $V_1$ into at least one variable output direct voltage $V_{out}$ and comprises at least two switched converter units, each having at least one electronically controllable half bridge, as well as a control unit designed to control the half bridges in a modulation method with a variable period duration and a variable duty cycle.

According to the invention, a dedicated current sensor is provided in each of the output lines of the switched converter units.

The control unit is designed to receive the amperages of the converter units measured by the current sensors and to control the converter units with duty cycles which differ from one another. In particular, the control unit can activate individual converter units with reduced duty cycles compared to other converter units. The control unit may also be designed not to activate individual converter units, i.e. to activate them with a duty cycle of zero. According to the invention, the control unit thus controls the proportion of the total transmitted electrical current transmitted via the respective converter units.

Preferably, the output lines of the converter units are interconnected after the current sensors. As a result, the currents of the output lines are summed. The control unit may be designed to calculate the sum current $I_{out}$ by querying the current sensors. Any number of converter units and assigned output lines can be provided. The control unit calculates the sum current as the sum of all currents of the output lines.

As a result, the control unit can adjust the modulation method in such a way that exactly those converter units are activated whose assigned current sensors have the minimum measurement error for the respective amperage of the sum current. Consequently, a minimal measurement error is achieved for the entire sum current without the need to switch measuring ranges. Instead of switching measuring ranges, the control unit activates those converter units whose assigned current sensors have the appropriate nominal current.

In particular, the control unit may be designed to activate the converter units depending on the calculated sum current $I_{out}$ or depending on a setpoint $I_{soll}$ of the sum current. In other words, the control unit can know the sum current to be transmitted in advance and activate in advance exactly those converter units whose assigned current sensors will lead to the slightest measurement error for this setpoint.

In embodiments of the invention, the current sensors may each have the same nominal currents $I_N$, $I_N'$. In other embodiments of the invention, the current sensors may have different nominal currents $I_N$, $I_N'$. In particular, the current sensors may each have different measuring ranges.

The nominal current of a current sensor is in each case associated with a particular scale accuracy (full-scale accuracy) within this measuring range. For example, a current sensor with $I_N$=600 A and a scale accuracy of 0.01% in the measuring range up to 600 A has an expected error of +/−60 mA, one with a nominal current of $I_N'$=300 A and the same scale accuracy in the measuring range up to 300 A has an error of +/−30 mA. The absolute expected measurement error of a current sensor with a high nominal current is therefore usually higher than that of a current sensor with a low nominal current.

The current sensors can in each case have a low-impedance electrical shunt resistor and a voltmeter. In particular, the current sensors may have measuring resistors $R_m$, $R_m'$ whose resistance values differ by a factor of at least 5, for example by a factor of 10 to 20. For example, the resistance value $R_m$ of a first current sensor can be around 100 µΩ and the resistance value $R_m'$ of a second current sensor around 2 mΩ. However, the current sensors can also have a magnetic circuit for inductive current measurement. The invention is not limited to particular mechanisms for current measurement.

The control unit may be designed to compare the sum current $I_{out}$ with the nominal currents $I_N$, $I_N'$ and to activate that converter unit whose associated current sensor has a nominal current which is greater than the sum current but lies closest to the sum current. This is advantageous if the sum current is less than a nominal current of an individual current sensor.

However, the control unit may also be designed to compare the sum current $I_{out}$ with the nominal currents $I_N$, $I_N'$ and to activate those converter units the sum of whose nominal currents is greater than the sum current, but lies closest to the sum current. This is advantageous if the sum current is greater than each individual nominal current of the current sensors. This ensures that the amperages in the output lines of the activated converter units are in each case below, but as close as possible to, the nominal current $I_N$, $I_N'$ of the assigned current sensors. As a result, the measuring ranges of the current sensors used are in each case used as far as possible in order to reduce the expected measurement error.

According to the invention, interleaving chokes may be provided in the output lines. At least one of the converter units may comprise two, three, four or more half bridges whose outputs are interconnected to form their common output line via interleaving chokes which may be in particular current-compensated.

Each of the half bridges may comprise two controlled semiconductor switches or a controlled semiconductor switch and a diode, wherein the semiconductor switches are preferably designed as SiC or GaN transistors, and wherein optionally several of these transistors are connected in parallel.

The converter units can be integrated into a common inverter module.

The control unit may be designed to control the half bridges with a switching frequency of up to 200 kHz, for example 24 kHz, 33 kHz, or 75 kHz, when using SiC transistors, and with a switching frequency of up to 2.5 MHz when using GaN transistors.

LC filter arrangements may be arranged in the output lines of the converter units which are formed as low-pass filters with cut-off frequencies above the frequency of the useful signal to be provided, preferably a cut-off frequency above 30 kHz, for example around 60 kHz, up to above 150 kHz.

Filter chokes may be provided in the LC filter arrangements which in each case have an inductance in the range of around 150 nH to 300 nH. The current sensors may for example have nominal currents $I_N$, $I_N'$ in the range of around 50 A, 175 A, 300 A, 600 A or 700 A. The measurement accuracies of the current sensors, in relation to their nominal currents $I_N$, $I_N'$, may for example be in the range of around +/−0.005%, +/−0.01% or +/−0.05%.

A DC-to-DC converter according to the invention may have a first measurement channel with low measurement accuracy and high dynamics, for example around 1 MHz, and a second measurement channel with high measuring accuracy and low dynamics, for example around 10 Hz, wherein the control unit may be designed for sequential or simultaneous interrogation of both measurement channels. The two measurement channels may be separated from each other, but the two measurement channels may also be integrated into the respective current sensors. For example, the current sensors can each have a shunt resistor for measuring the voltage drop and two associated voltage amplifiers as well as two downstream A/D converters for measuring and digitising the voltage drop in two measurement channels.

For the purpose of thermal conditioning, for example to ensure a temperature of the current sensors of around 50° C., the current sensors may be connected in a thermally conductive manner with cooling elements, for example peltier elements or liquid heat sinks, and/or with heating elements, for example heating resistors.

A DC-to-DC converter according to the invention may have an internal galvanic isolation to isolate the input direct voltage $V_1$ from the output direct voltage $V_{out}$, for example a transformer.

The invention further relates to a cell tester for testing one or more electric battery cells or fuel cells, comprising a DC-to-DC converter according to the invention. The term cell tester includes any device for testing electrical energy storage devices or fuel cells, in particular devices for testing individual cells, a plurality of cells, individual or multiple battery packs, or even entire electric batteries.

A grid converter with galvanic isolation, for example a transformer, may be provided to provide the input direct voltage $V_1$.

BRIEF DESCRIPTION OF THE SEVERAL VIEWS OF THE DRAWINGS

Further features according to the invention are disclosed in the claims, the figures and the following description of the figures. The invention is explained below with reference to non-exclusive exemplary embodiments.

DESCRIPTION OF SPECIFIC EMBODIMENTS OF THE INVENTION

Figure 1A:
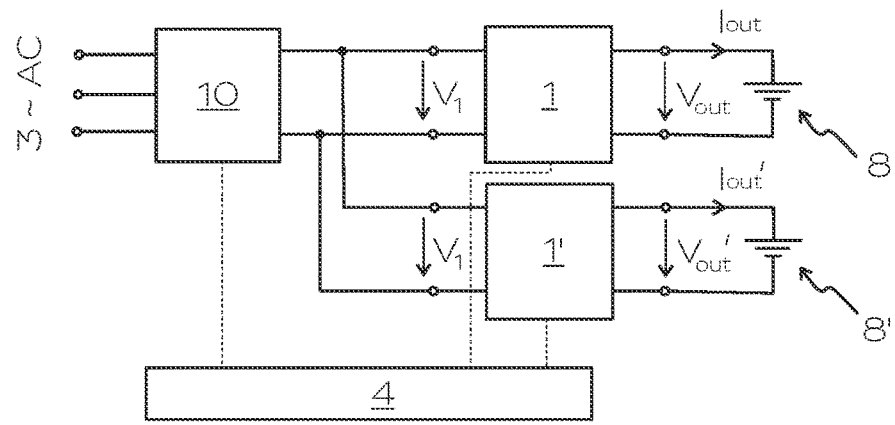
FIG. 1a shows a schematic block diagram of an embodiment of a cell tester according to the invention.

FIG. 1a shows a schematic block diagram of an embodiment of a cell tester according to the invention. The cell tester is designed for testing one or more electric battery cells 8, 8' which may for example be part of a common battery module, and comprises two DC-to-DC converters 1, 1' according to the invention.

The DC-to-DC converters 1, 1' are supplied with the input voltage $V_1$ by a common grid converter 10. The grid converter 10 is connected to the 3-phase supply network and is provided with a galvanic isolation, for example an internal transformer. The DC-to-DC converters 1, 1' generate independent direct voltages $V_{out}$, $V_{out}'$ which vary highly dynamically in the amplitude and frequency range for testing the battery cells 8, 8'. A control unit 4 is connected to both DC-to-DC converters 1, 1' via a schematically represented data line and receives the supplied current or voltage values from these. Furthermore, the control unit 4 is connected via control lines to the converter units of the DC-to-DC converter 1, 1'.

In an exemplary embodiment, not shown, each DC-to-DC converter 1, 1' includes an internal galvanic isolation. This is particularly advantageous if the battery cells 8.8' to be tested are electrically connected, for example if they are part of a common battery pack.

Figure 1B:
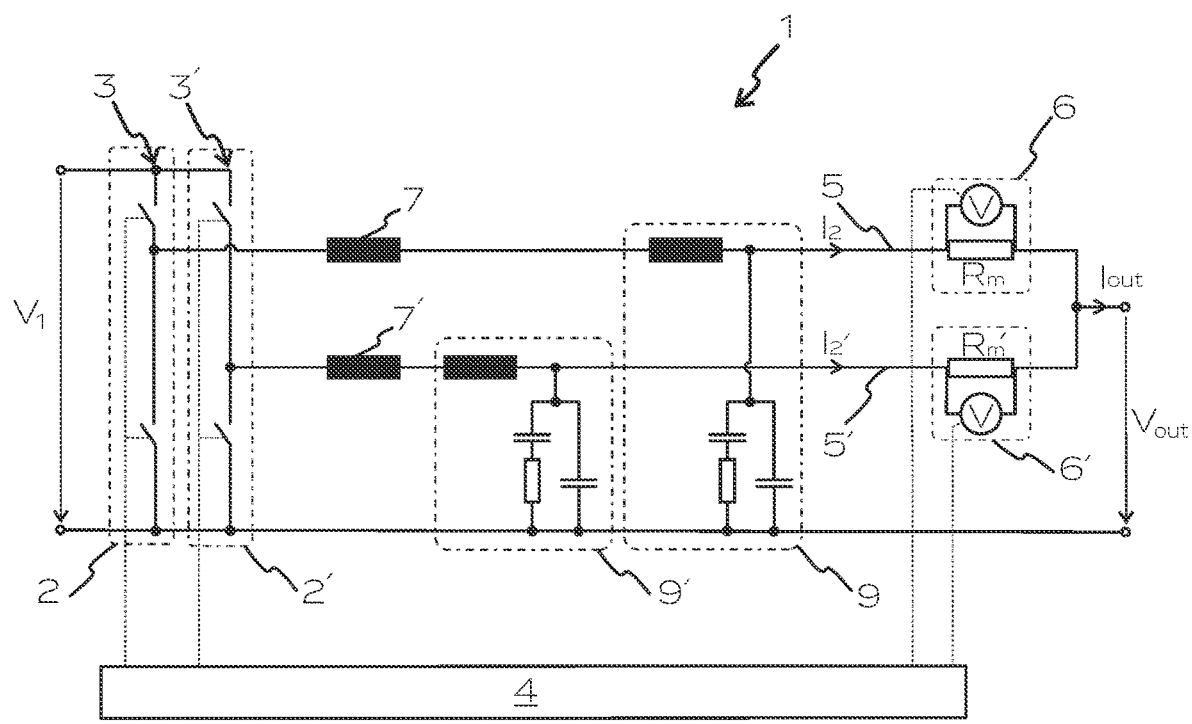
FIG. 1b shows a schematic circuit diagram of an embodiment of a DC-to-DC converter according to the invention.

FIG. 1b shows a schematic circuit diagram of an embodiment of a DC-to-DC converter 1 according to the invention. The DC-to-DC converter 1 comprises two switched converter units 2, 2', each having an electronically controllable half bridge 3, 3', and an electronic control unit 4 which is designed to control the half bridges 3, 3' in a modulation method with a variable period duration and a variable duty cycle. A dedicated current sensor 6, 6' is provided in each of the output lines 5, 5' of the converter units 2, 2'.

The control unit 4 is designed to receive and process the amperages $I_2$, $I_2'$ of the converter units 2, 2' measured by the current sensors 6, 6' via data lines which are indicated schematically.

The output lines 5, 5' of the converter units 2, 2' are interconnected after the current sensors 6, 6', so that the currents of the output lines 5, 5' are summed. The control unit 4 is designed to calculate the sum current $I_{out}=I_2+I_2'$.

The control unit 4 is further designed to control the converter units 2, 2' with duty cycles which differ from one another. The control unit can therefore activate the converter unit 2 with duty cycles which are reduced compared to the converter unit 2', or not activate one of the converter units 2, 2' at all. This is done depending on the calculated sum current $I_{out}$ or a setpoint value $I_{soll}$ of the sum current $I_{out}$.

In the present exemplary embodiment, the nominal current of the first current sensor 6 is equal to $I_N=600$ A and the nominal current of the second current sensor 6' is equal to $I_N'=300$ A. The scale error of the current sensors is 0.01%. In this case, with a sum current from 0 A to 300 A the control unit activates only the second converter unit 2' in order to limit the measurement error at +/−30 mA. With a sum current from 300 A to 600 A, the first converter unit 2' is activated and the second converter unit 2' is deactivated in order to limit the measurement error at +/−60 mA. With a sum current of 600 A to 900 A, the control unit activates both the first converter unit 2 and the second converter unit 2'. The first converter unit 2 can be activated with a duty cycle which is reduced compared to the second converter unit 2' in order to fully utilise the second current sensor 6' with a measuring current of 300 A, and to load the first current sensor 6 less. Finally, with a sum current of 900 A, both converter units 2, 2' are activated with the same duty cycle.

In a further exemplary embodiment, not shown, three converter units with identical current sensors are provided whose nominal currents are equal to $I_N=300$ A. The scale error of the current sensors is in each case 0.01%. In this case, with a sum current from 0 A to 300 A the control unit activates only the first converter unit in order to limit the measurement error at +/−30 mA. With a sum current from 300 A to 600 A, the second converter unit is additionally activated in order to limit the measurement error at +/−60 mA. With a sum current from 600 A to 900 A, the control unit additionally activates the third converter unit in order to limit the measurement error at +/−90 mA.

Interleaving chokes 7, 7' are provided in the output lines 5, 5' of the converter units 2, 2'. Each of the half bridges 3, 3' comprises two controlled semiconductor switches which are designed as SiC transistors, wherein several of these transistors are connected in parallel to form a semiconductor switch. The converter units 2, 2' are integrated in a common inverter module 8. The switching frequency in this exemplary embodiment is around 75 kHz.

LC filter arrangements 9, 9' are arranged in the output lines 5, 5' of the converter units 2, 2' which are designed as low-pass filters with cut-off frequencies above the frequency of the useful signal to be provided, in this case around 45 kHz.

Figure 1C:
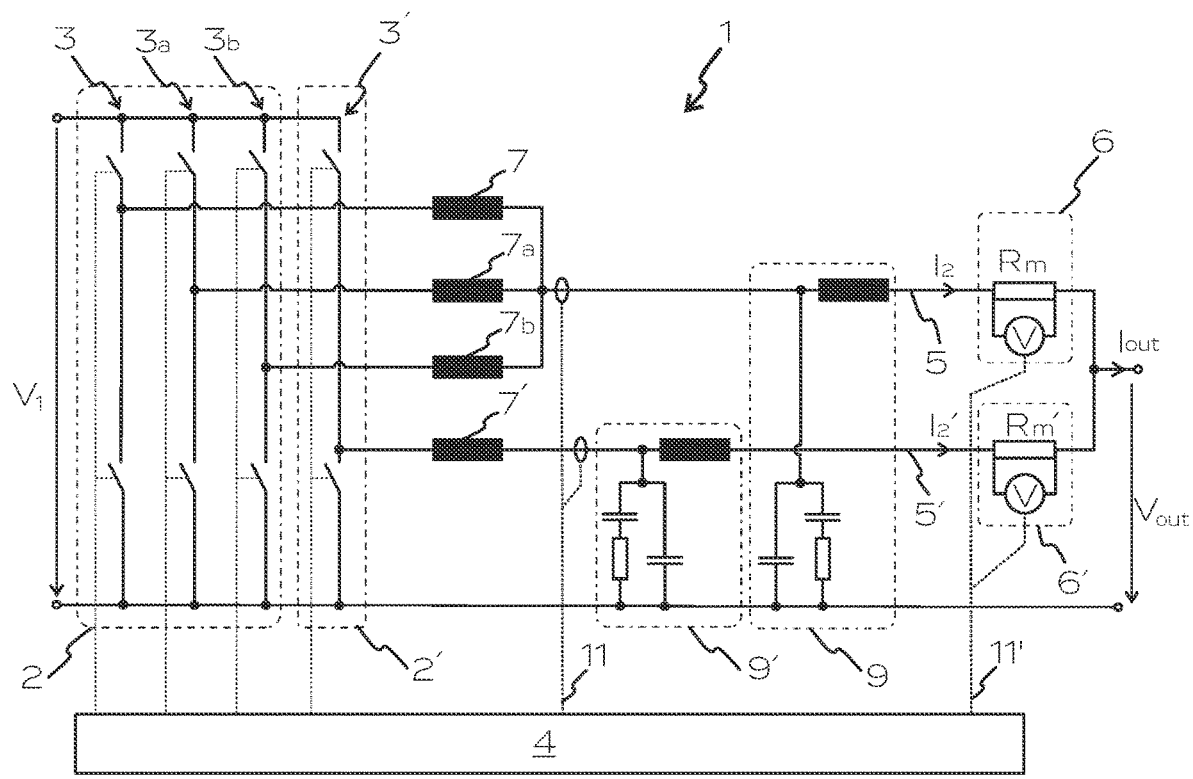
FIG. 1c shows a schematic circuit diagram of a further embodiment of a DC-to-DC converter according to the invention.

FIG. 1c shows a schematic circuit diagram of a further embodiment of a DC-to-DC converter according to the invention. This exemplary embodiment corresponds to that of FIG. 1b with the difference that the first converter unit 2 has three parallel-connected half bridges 3, 3a, 3b whose outputs are interconnected via interleaving chokes 7, 7a, 7b. Again, current sensors 6, 6' are provided in the two output lines 5, 5'. A first measurement channel 11 with low measurement accuracy and high dynamics, for example around 1 MHz, and a second measurement channel 11' with high measurement accuracy and low dynamics, for example around 10 Hz, are provided, wherein the control unit 4 is designed to query both measurement channels 11, 11'. The current sensors 6, 6' provide the second measurement channel 11'; on the other hand, separate, schematically indicated current sensors are provided for the first measurement channel 11.

Figure 1D:
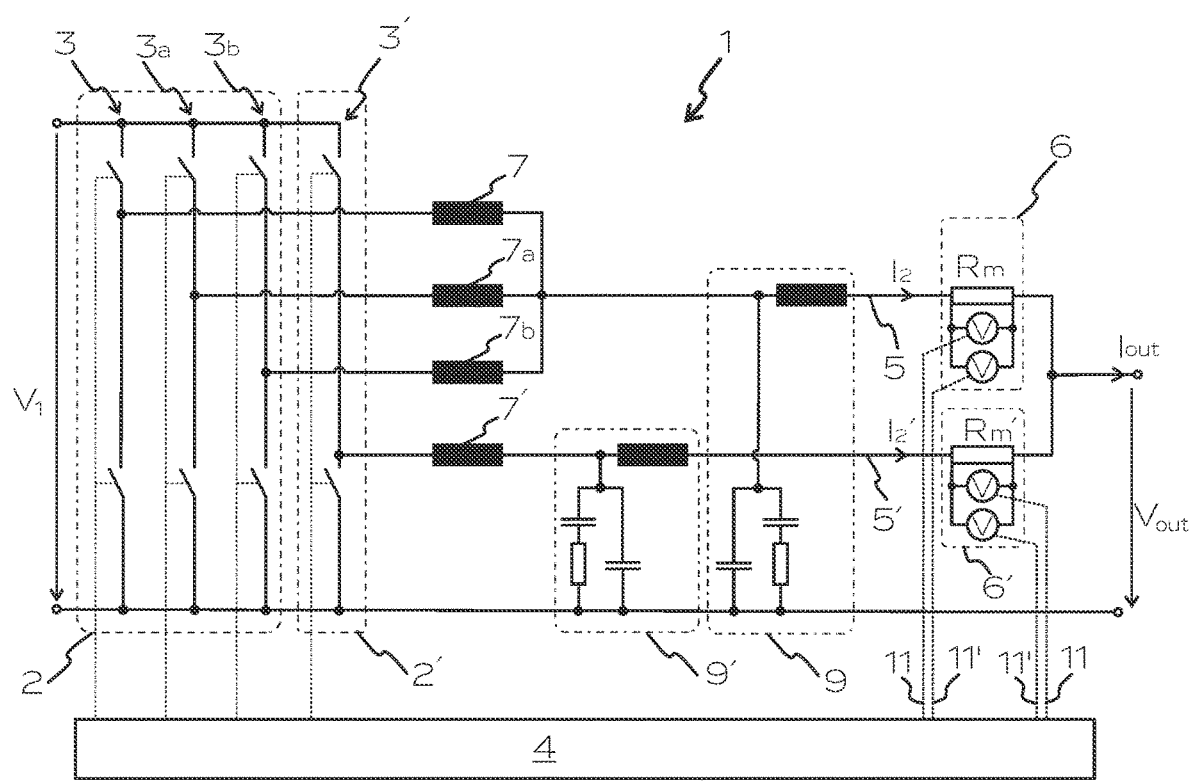
FIG. 1d shows a schematic circuit diagram of another embodiment of a DC-to-DC converter according to the invention.

FIG. 1d shows a schematic circuit diagram of another embodiment of a DC-to-DC converter according to the invention. This exemplary embodiment corresponds to that of FIG. 1c with the difference that the current sensors 6, 6' each provide a first measurement channel 11 and a second measurement channel 11'. For this purpose, two schematically indicated voltage measuring devices, for example in the form of separate voltage amplifiers with different cut-off frequencies and A/D converters, are in each case arranged in the current sensors 6, 6'.

The invention is not limited to the exemplary embodiments described, but includes all devices within the scope of the following claims. In particular, the invention is not limited to the use of particular types of current sensors.

LIST OF REFERENCE SYMBOLS

1 DC-to-DC converter
2, 2' converter unit
3, 3' half bridge
4 control unit
5, 5' output line
6, 6' current sensor
7, 7a, 7b, 7' interleaving choke
8, 8' battery cell
9, 9' LC filter arrangement
10 grid converter
11, 11' measurement channel

The invention claimed is:

1. DC-to-DC converter for converting an input direct voltage into at least one variable output direct voltage, comprising:
   a. at least two switched converter units, each having an output line and at least one electronically controllable half bridge, and b. a control unit which is designed to control the half bridges in a modulation method with a variable period duration and a variable duty cycle, wherein a dedicated current sensor is provided in the output line of each of the at least two switched converter units and having a nominal current associated with a scale accuracy within a measuring range of the dedicated current sensor, and the control unit is designed to receive amperages of the at least two switched converter units measured by the dedicated current sensors, and to selectively control individual converter units of the at least two switched converter units by activating individual converter units with duty cycles which are reduced compared to remaining ones of the at least two switched converter units, or by deactivating individual converter units, wherein the output line of each of the at least two switched converter units is interconnected from the respective dedicated current sensors so that currents are summed, wherein the control unit is designed to calculate a sum current, and compare the sum current with the nominal currents of the dedicated current sensors and a. to activate a selected converter unit whose respective dedicated current sensor has a nominal current which is greater than the sum current, but lies closest to the sum current, or b. to activate selected converter units whose respective dedicated current sensors have a sum of nominal currents that is greater than the sum current, and lies closest to the sum current, so that the amperage measured by each dedicated current sensor in the selected converter units remains below the nominal current thereof.

2. DC-to-DC converter according to claim 1, wherein the control unit is designed to activate the converter units depending on the calculated sum current or a setpoint of the sum current.

3. DC-to-DC converter according to claim 1, wherein the dedicated current sensors have equal nominal currents.

4. DC-to-DC converter according to claim 1, wherein the dedicated current sensors have different nominal currents.

5. DC-to-DC converter according to claim 1, wherein interleaving chokes are provided in the output line of each of the at least two switched converter units.

6. DC-to-DC converter according to claim 1, wherein at least one of the converter units comprises two, three, four or more half bridges having respective outputs, wherein the respective outputs are interconnected to form a common output line via interleaving chokes that are current-compensated.

7. DC-to-DC converter according to claim 1, wherein each of the half bridges has a. two controlled semiconductor switches, or b. a controlled semiconductor switch and a diode, wherein the semiconductor switches comprise SiC or GaN transistors, and wherein multiple transistors are connected in parallel.

8. DC-to-DC converter according to claim 1, wherein the converter units are integrated in a common inverter assembly.

9. DC-to-DC converter according to claim 1, wherein the control unit is designed to control the half bridges with a switching frequency selected from:

a. up to 200 kHz when using SiC transistors, and b. up to 2.5 MHz when using GaN transistors.

10. DC-to-DC converter according to claim 1, wherein at least one of LC filter arrangements is arranged in the output line of each of the at least two switched converter units, wherein the LC filter arrangements comprise low-pass filters with cut-off frequencies above a frequency of a signal to be provided, wherein the cut-off frequencies are above 30 kHz and up to 150 kHz.

11. DC-to-DC converter according to claim 10, wherein the LC filter arrangements comprise filter chokes having inductance values in a range of 150 nH to 300 nH.

12. DC-to-DC converter according to claim 1, wherein the current sensors have nominal currents in the range of around 50 A, 175 A or 700 A.

13. DC-to-DC converter according to claim 1, wherein the scale accuracy is in a measurement accuracy range of +/−0.01%.

14. DC-to-DC converter according to claim 1, wherein the control unit comprises:

a. a first measurement channel having low measurement accuracy and high dynamics of 1 MHz, and b. a second measurement channel having high measurement accuracy and low dynamics of 10 Hz, wherein the control unit is designed to query both measurement channels.

15. Cell tester for testing one or more electric battery cells or fuel cells, comprising the DC-to-DC converter according to claim 1.

16. Cell tester according to claim 15, wherein a grid converter having galvanic isolation is provided to supply the input direct voltage.

* * * * *